US010798042B2

(12) United States Patent
Zhao

(10) Patent No.: US 10,798,042 B2
(45) Date of Patent: Oct. 6, 2020

(54) INFORMATION SENDING METHOD AND APPARATUS

(71) Applicant: Alibaba Group Holding Limited, George Town (KY)

(72) Inventor: Hang Zhao, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 136 days.

(21) Appl. No.: 15/963,613

(22) Filed: Apr. 26, 2018

(65) Prior Publication Data

US 2018/0248833 A1 Aug. 30, 2018

Related U.S. Application Data

(63) Continuation of application No. PCT/CN2016/102830, filed on Oct. 21, 2016.

(30) Foreign Application Priority Data

Oct. 30, 2015 (CN) .......................... 2015 1 0729163

(51) Int. Cl.
G06F 15/16 (2006.01)
H04L 12/58 (2006.01)
H04L 29/06 (2006.01)

(52) U.S. Cl.
CPC ............. *H04L 51/30* (2013.01); *H04L 69/16* (2013.01); *H04L 51/04* (2013.01); *H04L 51/36* (2013.01); *H04L 51/38* (2013.01)

(58) Field of Classification Search
CPC ....... H04L 51/30; H04L 69/16; H04L 1/1816; H04L 29/06095; H04N 2201/3218; H04N 21/6375; H04N 21/64776; H04W 52/48

(Continued)

(56) References Cited

U.S. PATENT DOCUMENTS 8,599,734 B1 * 12/2013 Ram ..................... H04L 1/0002
370/312
2002/0120697 A1 * 8/2002 Generous ................ H04L 29/06
709/206

(Continued)

FOREIGN PATENT DOCUMENTS

CN 101355524 1/2009
CN 102427604 4/2012

(Continued)

OTHER PUBLICATIONS

International Search Report by the International Searching Authority issued in International Application No. PCT/CN2016/102830 dated Jan. 18, 2017; 8 pages.

(Continued)

*Primary Examiner* — Kaylee J Huang
(74) *Attorney, Agent, or Firm* — Fish & Richardson P.C.

(57) ABSTRACT

Data is identified for network transmission. A waiting period is determined for the particular data based on a content of the information. The particular data is transmitted to a device using a first transmission method. The first transmission method includes a mechanism to determine whether the particular data was received by the device. Determining whether the particular data transmitted using the first transmission method was received by the device. The particular data and a predetermined answer response identifier are transmitted to the device using a second transmission method. The second transmission method does not include a mechanism to determine whether the particular data was received by the device. Determining whether the particular data transmitted using the second transmission method was received by the device based on whether a response including the predetermined answer response identifier has been (Continued)

received. Transmitting additional data to the device using a non-mobile communication method.

17 Claims, 5 Drawing Sheets

(58) Field of Classification Search
USPC .......................... 709/206, 204, 203, 217, 230
See application file for complete search history.

(56) References Cited

U.S. PATENT DOCUMENTS

| | | | |
|---|---|---|---|
| 2003/0134621 | A1 | 7/2003 | Yabe et al. |
| 2009/0265471 | A1 | 10/2009 | Li et al. |
| 2010/0070588 | A1 | 3/2010 | Sinn et al. |
| 2010/0285775 | A1 | 11/2010 | Klein et al. |
| 2010/0325470 | A1* | 12/2010 | Underwood ............ H04W 4/14 714/2 |
| 2013/0151636 | A1* | 6/2013 | Majeti .................... H04L 51/04 709/206 |
| 2017/0090864 | A1* | 3/2017 | Jorgovanovic .......... G06F 3/167 |

FOREIGN PATENT DOCUMENTS

| | | |
|---|---|---|
| CN | 104753761 | 7/2015 |
| JP | 2004213649 | 7/2004 |
| JP | 2005117244 | 4/2005 |
| JP | 2015106358 | 6/2015 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Search Report and Written Opinion by the Intellectual Property Office of Singapore issued in SG Application No. 11201803582W dated Jul. 19, 2018; 9 pages.

European Extended Search Report in European Patent Application No. 16858966.1, dated Oct. 4, 2018, 10 pages.

* cited by examiner

INFORMATION SENDING METHOD AND APPARATUS

INFORMATION SENDING METHOD AND APPARATUS

This application is a continuation of PCT Application No. PCT/CN2016/102830, filed on Oct. 21, 2016, which claims priority to Chinese Patent Application No. 201510729163.8, filed on Oct. 30, 2015, and each application is hereby incorporated by reference in its entirety.

TECHNICAL FIELD

The present disclosure relates to the field of computer technologies, and in particular, to an information sending method and apparatus.

BACKGROUND

With rapid development in the information era, people's demand on information increases over time. To meet people's increasing demand for information, information service operators and developers provide a plurality of information obtaining methods for users. Therefore, when obtaining information, a user can select proper information obtaining methods in different cases, so as to significantly reduce the possibility that the user cannot obtain information due to influences of some external factors (such as unstable mobile communication signal), and provide convenience for the user to obtain information.

In regard to existing information sending methods, there are the following three sending methods.

An information sending method through a mobile communications network, such as an information sending method by using a short message or a multimedia message. This sending method can allow a user to quickly obtain information sent by a sender, and real-time performance of the obtained information is relatively high. However, a disadvantage of this method is that cost of sending the information is relatively high.

A first sending information sending method through the Internet. Based on the first sending method, a sender can detect whether a user receives information sent using the first sending method. The first sending method by using a Transmission Control Protocol (Transmission Control Protocol, TCP) persistent connection, such as information pushing. Using the first sending method, the user does not need to actively monitor information. Using the first sending method, because information is sent by using a network, the cost is relatively low. In addition, information sent by the sender to the user can actively pop up on a terminal device used by the user. Therefore, the user does not need to actively monitor the information. However, under this method, the user needs to install a client software related to the information pushing, so that a server can push information to the user. In addition, the client software installed by the user further needs to be online, and cannot block information sent by the sender, so that the information sent by the sender can be effectively received. Moreover, the user cannot receive and view information previously sent by the sender to the user using the first. Consequently, convenience for the user to view information is reduced.

A second sending information sending method through the Internet. Using the second sending method, a sender cannot detect whether a user receives information sent using the second sending method, and the user needs to actively monitor information. For example, the second sending method is an information sending method using an email, a direct message, or instant messaging. A transmission means of the second sending method is similar to that of the first sending method. Therefore, the cost is also relatively low. In addition, compared with the first sending method, the user can conveniently view information previously sent by the sender using the second method. However, when viewing information sent by the sender, the user usually needs to actively access an application (Application, APP) related to the second sending method or log in to a related mailbox to view obtained information. That is, the user cannot obtain, in a timely manner, information sent by the sender in real time if the user does not actively view information in the APP or the mailbox.

It can be seen from the three information sending methods described above that, differences exist between different information sending methods. A main concern of a sender is to select a sending method to save cost for sending information while ensuring that information can be effectively sent to a receiver. Therefore, to save information sending cost, for certain information that does not require high real-time performance, the sender usually sends the information to a user preferably using the first or second sending methods through the Internet.

Specifically, when sending the information to the user preferably using the first or second sending methods, the sender can send the information to the user only once when the sender sends the information using the second sending method. However, when the sender sends the information to the user using the first sending method, if the user is offline, the user still cannot receive and view the information even if the user logs in later. Therefore, the sender needs to periodically send the information to the user when sending the information using the first sending method. In addition, when the sender sends information to the user using the first sending method such as information pushing, after the information is received by the user, a client software used by the user can automatically return an acknowledgment message to the sender, to notify the sender that the information has been received. Therefore, the sender can detect whether the user receives, within a predetermined time period, the information sent by the sender using the first sending method. If the user receives, within the predetermined time period, the information sent by the sender using the first sending method, the sender does not need to periodically send the information using the first sending method. If the user does not receive, within the predetermined time period, the information sent by the sender using the first sending method, the sender needs to send the information to the user by using a mobile communications network.

However, it can be seen from the foregoing process that, if a user receives and views, within a predetermined time period, information sent by a sender using the second sending method (a method such as using e-mail or a direct message), but does not receive, within the predetermined time period, information sent by the sender using the first sending method, because the sender cannot detect whether the user receives the information sent using the second sending method using the second method, the sender may send the information to the user again in a relatively costly manner of using a mobile communications network. It not only increases information sending costs, but also wastes resources for sending information.

SUMMARY

Embodiments of the present disclosure provide an information sending method and apparatus, so as to resolve a problem that an information sending method in the prior art increases costs for sending information by a sender, and wastes resources used for sending information.

An embodiment of the present disclosure provides an information sending method, including: determining, by a server, information waiting to be sent and a corresponding waiting time of the information; determining a method of sending the information by using the Internet, where the sending method includes a first sending method that the server is capable of detecting whether the user receives the information, and a second sending method that the server is incapable of detecting whether the user receives the information; sending the information to the user using the first sending method; adding a predetermined answer response identifier to the determined information, and sending, to the user using the second sending method, the information that includes the added answer response identifier; detecting whether the user receives and views, within the waiting time, the information sent using the first sending method; and detecting, based on the answer response identifier, whether the user receives and views, within the waiting time, the information sent using the second sending method; and sending the information without using a mobile communications network if it is detected that the user receives and views, within the waiting time, the information sent using the first sending method or the second sending method; or sending the information by using a mobile communications network if it is detected that the user does not receive and view, within the waiting time, the information sent using the first sending method or the second sending method.

An embodiment of the present disclosure provides an information sending method, including: receiving information sent by a server; determining whether the information includes an answer response identifier; and if the information includes the answer response identifier, returning, to the server, an acknowledgment message corresponding to the answer response identifier, so that the server no longer sends the information after receiving the acknowledgment message; or if the information does not include the answer response identifier, skipping returning an acknowledgment message to the server.

An embodiment of the present disclosure provides an information sending apparatus, including: a time determining module, configured to determine information waiting to be sent and a corresponding waiting time of the information; a method determining module, configured to determine a method of sending the information by using the Internet, where the sending method includes a first sending method that the apparatus is capable of detecting whether the user receives the information, and a second sending method that the apparatus is incapable of detecting whether the user receives the information; a sending module, configured to: send the information to the user using the first sending method, and send, to the user using the second sending method, information that includes an added answer response identifier; an adding module, configured to: add a predetermined answer response identifier to the determined information, and instruct the sending module to send, to the user using the second sending method, the information that includes the added answer response identifier; and a detection module, configured to: detect whether the user receives and views, within the waiting time, the information sent using the first sending method; detect, based on the answer response identifier, whether the user receives and views, within the waiting time, the information sent using the second sending method; and if it is detected that the user receives and views, within the waiting time, the information sent using the first sending method or the second sending method, instruct the sending module to send the information without using a mobile communications network; or if it is detected that the user does not receive and view, within the waiting time, the information sent using the first sending method or the second sending method, instruct the sending module to send the information by using a mobile communications network.

An embodiment of the present disclosure provides an information sending apparatus, including: a receiving module, configured to receive information sent by a server; a determining module, configured to determine whether the information includes an answer response identifier; and a sending module, configured to: when a result of the determining performed by the determining module is yes, return, to the server, an acknowledgment message corresponding to the answer response identifier, so that the server no longer sends the information after receiving the acknowledgment message; or when a result of the determining performed by the determining module is no, skip returning an acknowledgment message to the server.

The embodiments of the present disclosure provide an information sending method and apparatus. In the method, a server separately sends, within a waiting time, information waiting to be sent, the information to a user using a first sending method and a second sending method; detects, within the waiting time, whether the user receives and views the information sent using the first sending method and the second sending method; and sends the information to the user without using a mobile communications network if the user receives and views the information sent using the first sending method and the second sending method; or sends the information to the user by using a mobile communications network if the user does not receive and view the information sent using the first sending method and the second sending method. When sending information by using the method, a server can effectively detect, within a waiting time, whether a user has viewed the information sent by the server in a second sending method, and after detecting that the user has viewed the information, the server no longer sends the information to the user by using a mobile communications network. Compared with the prior art, information sending costs can be effectively reduced, and resources required for sending information can be reduced.

BRIEF DESCRIPTION OF DRAWINGS

The accompanying drawings described herein are intended to provide a further understanding of the present disclosure, and constitute a part of the present disclosure. The example embodiments of the present disclosure and descriptions thereof are intended to explain the present disclosure, and do not constitute an improper limitation on the present disclosure. In the accompanying drawings.

DESCRIPTION OF EMBODIMENTS

The present disclosure is intended to detect whether a user receives and views, within a waiting time, information sent using a second sending method such as an email, a direct message, or instant messaging. Therefore, a server needs to add a predetermined answer response identifier to information waiting to be sent before sending the information using the second sending method, and then sends, to the user using the second sending method, the information that includes the added answer response identifier. When identifying that the information sent using the second sending method includes the answer response identifier, a terminal device used by the user can automatically return a corresponding acknowledgment message, so that the server can acknowledge that the user has received and viewed the information sent using the second sending method, and may no longer send the information in certain method, such as a short message service message or a multimedia message, of sending information by using a mobile communications network. Therefore, resources consumed for sending information are reduced.

To meet the objectives, technical solutions, and advantages of the present disclosure, the following describes the technical solutions of the present disclosure with reference to specific embodiments of the present disclosure and corresponding accompanying drawings. Apparently, the described embodiments are merely some rather than all of the embodiments of the present disclosure. Other embodiments obtained by persons of ordinary skill in the art based on the embodiments of the present disclosure without creative efforts shall fall within the protection scope of the present disclosure.

Figure 1:
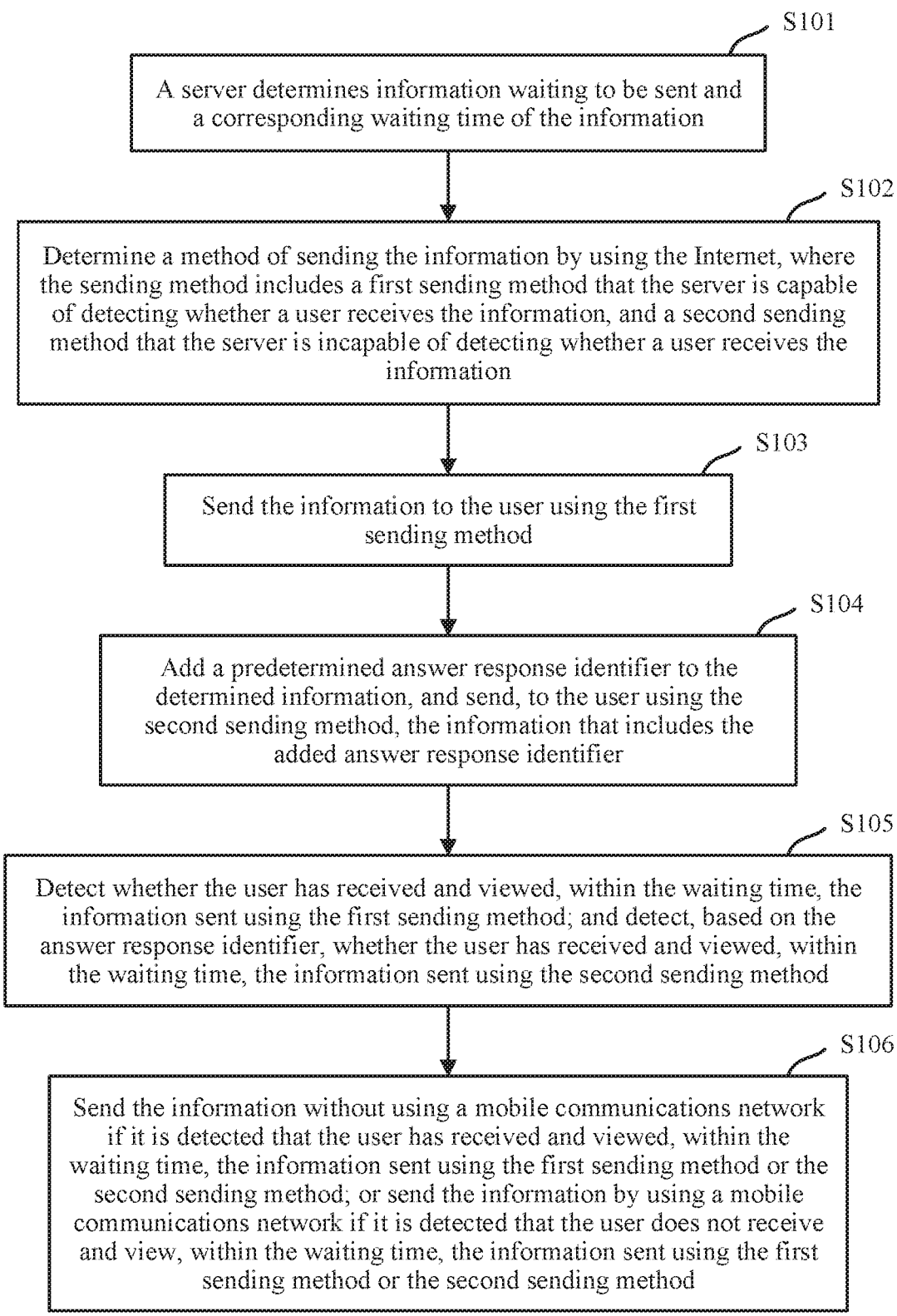
FIG. 1 shows an information sending process, according to an embodiment of the present disclosure.

FIG. 1 shows an information sending process according to an embodiment of the present disclosure. The process specifically includes the following steps.

S101. A server determines information waiting to be sent and a corresponding waiting time of the information.

In some implementations, the server usually sends to a user some information such as a bank transfer notification, entertainment news, or game advertisement. The server needs to first determine specific content of the information before sending the information to the user. Accordingly, in an embodiment of the present disclosure, before sending information to the user, the server can first determine information that needs to be sent to the user.

However, in a process in which the server sends information to the user, a network communication connection between the server and the user may be poor, or a client software or an application of the user for receiving the information may be offline. As a result, the user may not be able to receive the information sent by the server in a timely manner. To increase a user's success rate of receiving information sent by the server, the server can determine a corresponding waiting time of information waiting to be sent, and the server can send the information to the user using a sending method within the waiting time. The waiting time can be determined based on factors such as a size of the information waiting to be sent and a type of information content.

For example, it is assumed that the information waiting to be sent determined by the server is text information. Because text information usually occupies a relatively small data volume, the server can determine a relatively short waiting time, so that the server can send the information to the user in a sending method within the waiting time. However, if the information waiting to be sent determined by the server is multimedia information such as a picture or a video, the server can determine a relatively long waiting time because multimedia information usually has a relatively large data volume.

S102. Determine a method of sending the information by using the Internet, where the sending method includes a first sending method that the server is capable of detecting whether the user receives the information, and a second sending method that the server is incapable of detecting whether the user receives the information.

After determining the information waiting to be sent and the corresponding waiting time of the information by using step S101, the server can determine a method of sending the information. The server can determine the method of sending the information as the first sending method if whether a user receives the information sent by the server can be determined, or the second sending method if whether a user receives the information sent by the server cannot be determined. Certainly, the server can determine only one of the first sending method or the second sending method.

Specifically, before sending information to the user, the server can first determine a method of sending the information. To minimize costs required for sending the information, a sender can send the information by using the server and the Internet as transmission means. The server can determine, based on a specific type of the information, the sending method used to send the information. For example, if the server needs to send a relatively small amount of information to the user, the server can determine a method of sending the information as the first sending method, such as information pushing, of sending information by using a TCP persistent connection. If the server needs to send information of a relatively large amount to the user, the server can determine a method of sending the information as the second sending information sending method by means of at least one of an email, a direct message, or instant messaging. In order for the user to receive and view the information sent by the server as much as possible within the waiting time determined by the server, in this embodiment of the present disclosure, the server can determine the method of sending the information using the two earlier described sending methods, that is, the server separately sends the information to the user using the first sending method and the second sending method. That is, the server separately sends the information to the user in both of the two sending methods regardless of the information type.

S103. Send the information to a user using the first sending method.

The server can send, to the user using the first sending method, the determined information that needs to be sent to the user, where the first sending method is a method of sending information by using a TCP persistent connection such as information pushing.

In the prior art, when the server sends information to the user using the first sending method of sending information by using a TCP persistent connection such as information pushing, a user terminal automatically returns an answer response after receiving the information, so that after receiving the answer response, the server learns that the user has received the information sent by the server to the user using the first sending method. Therefore, when sending the information waiting to be sent using the first sending method determined by using step S101 to the user (that is, a terminal device used by the user), the server can directly send the information using the first sending method without performing any processing of the information. Specifically, when information is sent to the user using the first sending method such as information pushing, if the user is offline at the time (that is, the user is not logged in to a corresponding client software), the user still cannot receive the information previously sent by the server using the first sending method even if the user later goes online. Therefore, when sending the information waiting to be sent using the first sending method determined by the server, the server can periodically send the information using the first sending method to the user at a specified time interval.

S104. Add a predetermined answer response identifier to the determined information, and send the information that includes the added answer response identifier to the user using the second sending method.

The present disclosure is intended to detect whether the user receives and views, within the waiting time, information sent using the second sending method such as an email, a direct message, or instant messaging. Therefore, to effectively detect whether the user receives and views the information sent by the server using the second sending method, the server can add a predetermined answer response identifier to the information sent to the user, so that after receiving the information sent by the server, the terminal device used by the user can recognize the answer response identifier carried in the information, and can automatically return an acknowledgment message corresponding to the answer response identifier after recognizing the answer response identifier. Therefore, the server learns that the user has received and viewed the information.

The answer response identifier can be an identifier, that is, the server and the terminal device can predetermine an identifier as the answer response identifier. If the terminal device recognizes that the information sent by the server includes the identifier, the terminal device returns an acknowledgment message as a response to the server.

After adding the predetermined answer response identifier to the determined information waiting to be sent, the server can send the information to the user using the second sending method. Specifically, after information is sent to the user using the second sending method such as an email, a direct message, or instant messaging, the user can receive and view the information provided that the user logs in to corresponding software or a corresponding client. Therefore, the server can send, to the user only once using the second sending method, the information that includes the added answer response identifier.

It should be noted that, the server can use any order to send information that includes the added answer response identifier using the second sending method and information waiting to be sent determined at S101 using the first sending method.

S105. Detect whether the user receives and views the information sent using the first sending method within the waiting time; and detect, based on the answer response identifier, whether the user receives and views the information sent using the second sending method within the waiting time.

When directly sending the information waiting to be sent determined in step S101 to the user using the first sending method, the server detects whether the user receives the information within the waiting time. Specifically, when receiving the information sent by the server using the first sending method, the terminal device used by the user returns an answer response to the server. After receiving the answer response, the server can learn that the user has received the information sent by the server to the user using the first sending method, hence may no longer send the information to the user in any method.

When sending the information that includes the added response identifier to the user using the second sending method, the server detects, based on the answer response identifier within the waiting time, whether the user has received and viewed the information. Specifically, when the user has received and viewed the information, the terminal device used by the user recognizes that the information includes the answer response identifier, and then can return an acknowledgment message corresponding to the answer response identifier to the server. After receiving the acknowledgment message, the server can learn that the user has received and viewed the information sent by the server to the user using the second sending method. That is, a method that the server detects whether the user has received and viewed the information within the waiting time sent using the second sending method can be detailed as follows: The server detects whether the acknowledgment message corresponding to the answer response identifier and returned by the user (that is, the terminal device used by the user) is received within the waiting time; and if the acknowledgment message is received within the waiting time, determining that the user has received and viewed the information sent using the second sending method within the waiting time; or if the acknowledgment message is not received within the waiting time, determines that the user has not received and viewed the information sent using the second sending method within the waiting time.

S106. Send the information without using a mobile communications network if it is detected that the user has received and viewed the information sent using the first sending method or the second sending method within the waiting time; or send the information by using a mobile communications network if it is detected that the user has not received and viewed the information sent using the first sending method or the second sending method within the waiting time.

When detecting, within the waiting time, that the user has received and viewed the information sent by the server using the first sending method or the second sending method, the server no longer sends the same information to the user in an information sending method by using a mobile communications network. If the server detects, within the waiting time, that the user does not receive and view the information sent by the server using the first sending method or the second sending method, the server can send the same information to the user in an information sending method by using a mobile communications network. In the present disclosure, the information sending method by using a mobile communications network can be a sending method such as a short message service message or a multimedia message.

For example, if the server determines, by using step S101, that the information waiting to be sent is text information and that a corresponding waiting time of the text information is between Oct. 19, 2015 and Oct. 20, 2015, the server adds an answer response identifier to the text information by using step S104, and sends, to the user using the second sending method, the text information that includes the added answer response identifier. In addition, the server sends, to the user using the first sending method by using step S103, the text information that the answer response identifier is not added. After separately sending the information using the first sending method and the second sending method, the server detects, by using step S105, whether an answer response that is corresponding to the first sending method and that is returned by the user is received within the waiting time, and whether an acknowledgment message that is corresponding to the answer response identifier and that is returned by the user is received within the waiting time. If the answer response or the acknowledgment message is received within the waiting time, the server may no longer send the text information to the user in the information sending method by using a mobile communications network; or if neither the answer response nor the acknowledgment message is received within the waiting time, the server can send the text information to the user in the information sending method by using a mobile communications network.

In the information sending method described above, it can be detected, within the waiting time, whether the user has received and viewed the information sent by the server using the second sending method. When it is detected that the user has received and viewed the information sent by the server using the second sending method within the waiting time, the server may no longer send the information to the user using the first sending method even if the server detects that the user has not received the information sent by the server using the first sending method within the waiting time. In addition, after the server detects that the user has not received the information sent by the server using the first sending method within the waiting time, when the waiting time is reached, the server does not send the information to the user using a mobile communications network. Therefore, information sending costs and resources used for sending information can be effectively reduced.

Further, in the process shown in FIG. 1, when sending information to the user using the first sending method such as information pushing, the server needs to periodically send the information within a waiting time. However, if the user has received and viewed the information sent by the server using the first sending method or the second sending method within the waiting time, the server may no longer need to periodically send the information using the first sending method. Therefore, in this embodiment of the present disclosure, if the server detects, within the waiting time, that the user has received and viewed the information sent using the first sending method or the second sending method, the server may no longer send the information to the user using the first sending method.

In addition, in step S102 shown in FIG. 1, the server can determine the information sending method by using the Internet based on a protocol used for each sending method. Specifically, as shown in Table 1, the server can pre-store a table of a mapping relationship between a protocol used for each information sending method over the Internet and whether a user has received the information can be detected. The server can then determine, based on the mapping table, a sending method is the first sending method that whether a user has received the information can be detected, or a sending method is the second sending method that whether a user has received the information cannot be detected.

Table 1 is a table, provided in this embodiment of the present disclosure, of a mapping relationship between protocols used by information sending method over the Internet and whether a user has received the information can be detected.

TABLE 1

| Protocol used for a sending method | Example of a sending method | Whether it can be detected that a user receives information |
| --- | --- | --- |
| TCP persistent connection | Information pushing | Yes |
| Simple Mail Transfer Protocol (Simple Mail Transfer Protocol, SMTP), Post Office Protocol 3 (Post Office Protocol 3, POP3), or the like | Email | No |
| Instant Messaging and Presence Protocol (IMPP) or the like | Instant messaging | No |

The server can determine, based on the pre-stored Table 1, that information pushing uses the first sending method, and e-mail and instant messaging use the second sending method.

Figure 2:
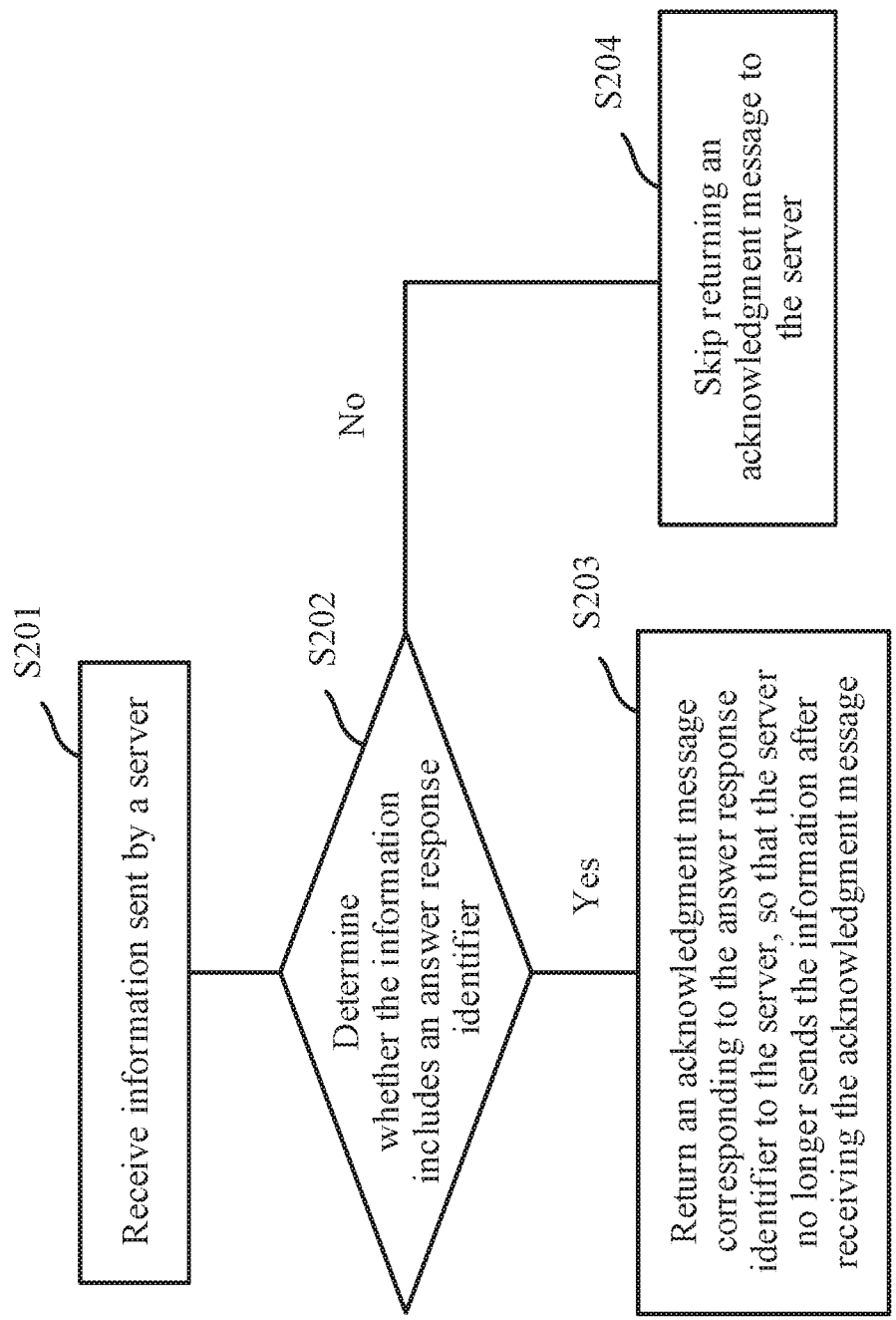
FIG. 2 shows an information sending process corresponding to FIG. 1, according to an embodiment of the present disclosure.

FIG. 2 shows an information sending process corresponding to FIG. 1, according to an embodiment of the present disclosure. The process includes the following steps:

S201. Receive information sent by a server.

S202. Determine whether the information includes an answer response identifier, and perform step S203 if the information includes the answer response identifier, or perform S204 if the information does not include the answer response identifier.

S203. Return an acknowledgment message corresponding to the answer response identifier to the server, so that the server no longer sends the information after receiving the acknowledgment message.

S204. Skip returning an acknowledgment message to the server.

In step S201 shown in FIG. 2, the information sent by the server and received by a terminal device can be sent by the server in one or more of a first sending method, a second sending method, or an information sending method by using a mobile communications network. If the information received by the terminal device is sent by the server using the information sending method (a method such as a text message or a multimedia message) by using a mobile communications network, the terminal device may not need to perform subsequent steps S202 to S204. If the information received by the terminal device is sent by the server using the second sending method (a sending method such as an email, a direct message, or instant messaging), the terminal device needs to determine whether to return the acknowledgment message to the server by using subsequent steps S202 to S204. If the information received by the terminal device is sent by the server using the first sending method (a sending method such as information pushing), the terminal device also may not need to perform subsequent steps S202 to S204, and can directly return an answer response to the server.

That is, after receiving the information sent by the server using step S201, the terminal device can first determine whether the information is sent by the server using the second sending method. If the information is sent by the server using the second sending method, the terminal device can determine whether to return the acknowledgment message to the server by using the subsequent steps S202 to S204; or if the information is not sent by the server using the second sending method, the terminal device does not need to determine whether to return the acknowledgment message to the server by using the subsequent steps S202 to S204.

In addition, in step S203 shown in FIG. 2, the step of returning the acknowledgment message to the server by the terminal device can be triggered by a specific operation of a user. For example, if the second sending method is e-mail, when a user receives an email sent by the server that includes an answer response identifier after logging to an e-mail account, the user may not return an acknowledgment message to the server. However, when the user clicked the email, it is determined that the user has performed a specific operation. In such case, the acknowledgment message is triggered on the terminal device to be returned to the server.

As another example, if the second sending method is instant messaging, when a user receives instant messaging information sent by the server that includes an answer response identifier after logging to an instant messaging account, the user may also not return an acknowledgment message to the server. However, when the user opens a chatting interface corresponding to the instant messaging information, it is determined that the user has performed a specific operation. In such case, the acknowledgment message is triggered on the terminal device to be returned to the server.

The previous descriptions illustrate information sending methods provided in the embodiments of the present disclosure. Based on similar ideas, the embodiments of the present disclosure further includes two information sending apparatuses, as shown in FIG. 3 and FIG. 4.

Figure 3:
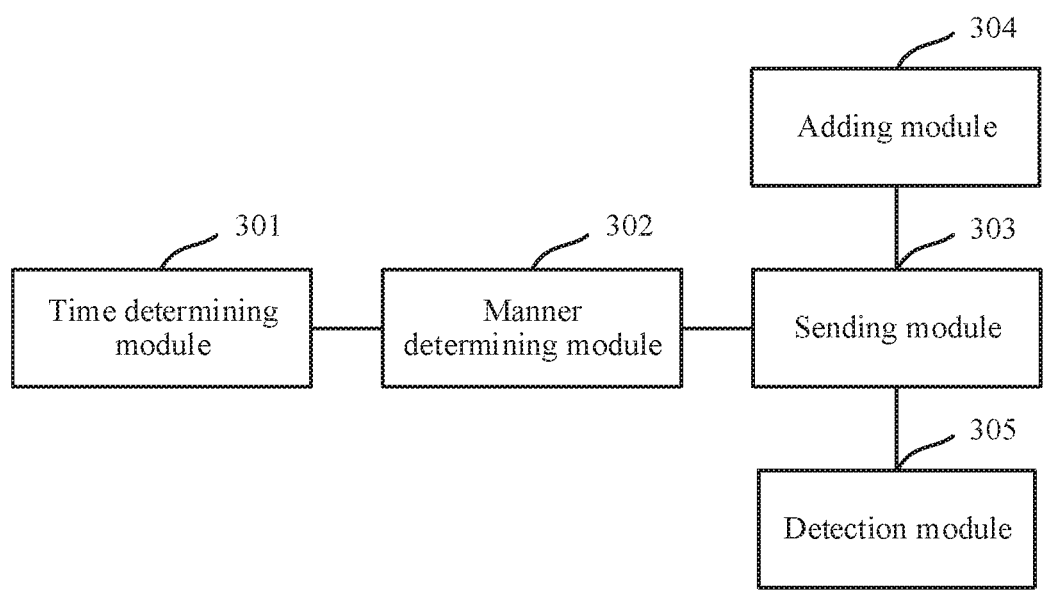
FIG. 3 is a schematic structural diagram of an information sending apparatus, according to an embodiment of the present disclosure.
Figure 4:
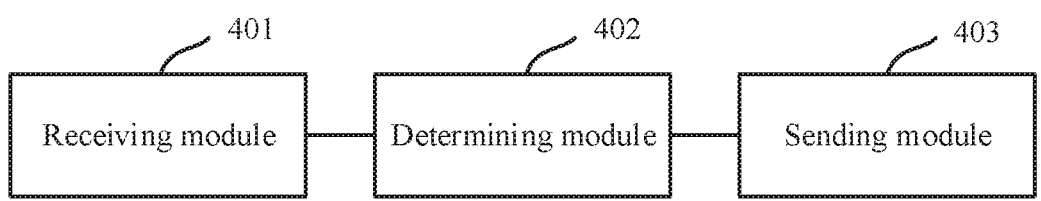
FIG. 4 is a schematic structural diagram of another information sending apparatus, according to an embodiment of the present disclosure.

FIG. 3 is a schematic structural diagram of an information sending apparatus according to an embodiment of the present disclosure. The apparatus includes:

a time determining module 301, configured to determine information waiting to be sent and a corresponding waiting time of the information;

a method determining module 302, configured to determine a method of sending the information over the Internet, where the sending method includes a first sending method that the apparatus is capable of detecting whether the user receives the information, and a second sending method that the apparatus is incapable of detecting whether the user receives the information;

a sending module 303, configured to: send the information to the user using the first sending method, and send information that includes the added answer response identifier to the user using the second sending method;

an adding module 304, configured to: add a predetermined answer response identifier to the determined information, and instruct the sending module 303 to send the information that includes the added answer response identifier to the user using the second sending method; and a detection module 305, configured to: detect whether the user has received and viewed, within the waiting time, the information sent using the first sending method; detect, based on the answer response identifier, whether the user has received and viewed user has received and viewed the information sent using the second sending method within the waiting time; and if it is detected that the user has received and viewed the information sent using the first sending method or the second sending method within the waiting time, instruct the sending module 303 to send the information without using a mobile communications network; or if it is detected that the user has not received and viewed the information sent using the first sending method or the second sending method within the waiting time, instruct the sending module 303 to send the information by using a mobile communications network.

The first sending method includes an information sending method by using a TCP persistent connection.

The second sending method includes an information sending method using at least one of an email, a direct message, or instant messaging.

The sending module 304 is configured to send the information that includes the added answer response identifier to the user using the second sending method.

The detection module 305 is configured to: detect whether an acknowledgment message corresponding to the answer response identifier and returned by the user is received within the waiting time; and if the acknowledgment message is received within the waiting time, determine that the user has received and viewed the information sent using the second sending method within the waiting time; or if the acknowledgment message is not received within the waiting time, determine that the user has not received and viewed the information sent using the second sending method within the waiting time.

The sending module 303 is specifically configured to send the information to the user using the first sending method at a specific time interval.

The detection module 305 is further configured to: when detecting that the user has received the information sent using the first sending method or the second sending method within the waiting time, skip instructing the sending module 303 to send the information to the user by using a mobile communications network.

FIG. 4 is a schematic structural diagram of another information sending apparatus, according to an embodiment of the present disclosure. The apparatus specifically includes:

a receiving module 401, configured to receive information sent by a server;

a determining module 402, configured to determine whether the information includes an answer response identifier; and a sending module 403, configured to: when a result of the determining performed by the determining module 402 is yes, return, to the server, an acknowledgment message corresponding to the answer response identifier, so that the server no longer sends the information after receiving the acknowledgment message; or when a result of the determining performed by the determining module 402 is no, skip returning an acknowledgment message to the server.

The embodiments of the present disclosure provide an information sending method and apparatus. In the method, a server separately sends, within a waiting time of information waiting to be sent, the information to a user in a first sending method and a second sending method; detects whether the user has received and viewed the information sent using the first sending method and the second sending method within the waiting time; and if it is detected that the user has received and viewed the information sent using the first sending method and the second sending method, sends the information to the user without using a mobile communications network; or if it is detected that the user has not received and viewed the information sent using the first sending method or the second sending method, send the information to the user in an information sending method by using a mobile communications network. When sending information by using the previously mentioned methods, a server can effectively detect whether a user has viewed information sent by the server in a second sending method within the waiting time. After detecting that the user has viewed the information, the server no longer needs to send the information to the user using a mobile communications network. Compared with prior art, information sending costs and resources used for sending information can be effectively reduced.

In a typical configuration, a computing device includes one or more processors (CPU), an input/output interface, a network interface, and a memory.

The memory can include a non-persistent memory, a random access memory (RAM), a non-volatile memory, and/or another form that are/is in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of a computer storage medium include but are not limited to: a phase change memory (PRAM), static random access memory (SRAM), dynamic random access memory (DRAM) or another type of random access memory (RAM), read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette, magnetic tape, magnetic tape, a magnetic disk memory or another magnetic storage device, or any other non-transmission medium that can be used to store information that can be accessed by a computing device. According to a definition in this specification, the computer readable medium does not include computer-readable transitory media (transitory media) such as a modulated data signal and a carrier.

It should be further noted that, the terms "include", "contain", or their any other variant is intended to cover a non-exclusive inclusion, so that a process, a method, an article, or a device that includes a list of elements not only includes those elements but also includes other elements that are not expressly listed, or further includes elements inherent to such process, method, article, or device. An element defined by "includes a . . . " further includes, without more constraints, another identical element in the process, method, article, or device that includes the element.

Persons skilled in the art should understand that the embodiments of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a magnetic disk memory, a CD-ROM, an optical memory, and the like) that include computer usable program code.

The foregoing embodiments are merely embodiments of the present disclosure, and are not intended to limit the present disclosure. Persons skilled in the art can make various modifications and changes to the present disclosure. Any modification, equivalent replacement, or improvement made without departing from the spirit and principle of the present disclosure shall fall within the scope of the claims of the present disclosure.

Figure 5:
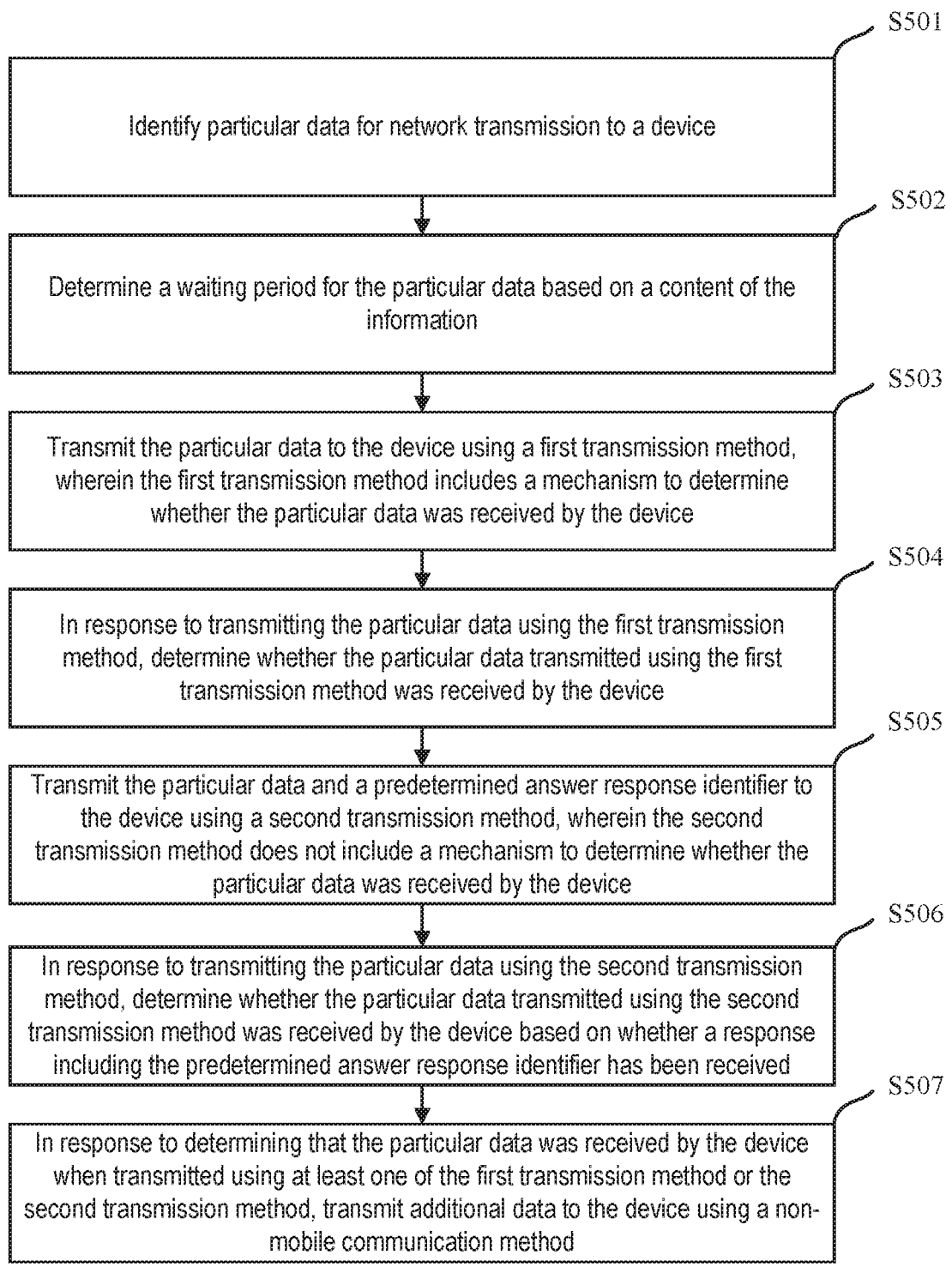
FIG. 5 is a flowchart illustrating an example method for an information sending process, according to the present disclosure.

FIG. 5 shows a flowchart illustrating an example method for an information sending process, according to the present disclosure. The process 500, illustrated in FIG. 5, includes the following steps.

In S501, the server identifies particular data for network transmission to a device. For instance, the particular information can include bank account information, multimedia data, text message content, email data, control information for messages, and database information. In some implementations, the server can receive instructions from a user for the particular data to transmit from the terminal. In other implementations, the server may automatically transmit the particular data to the terminal on a periodic basis. The server can retrieve content from a database or other external device before transmitting to the terminal.

In S502, the server determines a waiting period for the particular data based on a content of the information. For instance, the server determines the waiting period based on a type of the particular data and the size of the particular data. The larger the data to transmit to the terminal, the longer the waiting period for the server to transmit and receive a response from the terminal. Additionally, based on a type of the particular data, the waiting period can vary. If the type of content is a multimedia file, the server may decide that the waiting period is longer than if the type of content is a text file. Transmitting multimedia data requires different protocol methods to transmit the data and ensure the data is successfully received at the receiving end. Whereas, the server can transmit the textual data without ensuring a handshaking mechanism, such as with TCP, mentioned above. For instance, if it takes the server 1.5 seconds to transmit the multimedia data, the server can set a waiting period of 4 seconds to ensure the terminal has at least 1.5 seconds to transmit a response to the server, and at least another second to process the data received at the terminal end.

In S503, the server transmits the particular data to the device using a first transmission method, wherein the first transmission method includes a mechanism to determine whether particular data was received by the device. The server can determine the first transmission method to include a transmission protocol that ensures the particular data is successfully received, such as TCP, SMTP, or WPA2 wireless. For transmission, the server retrieves the particular data and transmits the particular data to the terminal corresponding to the user using the first transmission method. For example, the server transmits the multimedia data file to the terminal corresponding to the user using TCP as the first transmission method. The server can continuously transmit the particular data periodically within the determined waiting period (or until the waiting period expires).

In S504, in response to transmitting the particular data using the first transmission method, the server determines whether the particular data transmitted using the first transmission method was received by the device. In particular, the server detects whether the device has provided a response to the particular data transmitted using the first transmission method. For example, the response can include an acknowledgement that the data has been received.

In S505, the server transmits the particular data and a predetermined answer response identifier to the device using a second transmission method, wherein the second transmission method does not include a mechanism to determine whether the particular data was received by the device. The second transmission method may include the use of protocols such as UDP, as known by those skilled in the art. The server adds a predetermined answer response identifier to the particular data. For example, the predetermined answer response identifier can be a message such as an "ACK" that indicates to the terminal to provide a response message to the server. In another example, the predetermined answer response identifier can include an IP address or a MAC address of the server that allows the terminal to know a destination for sending the response. The server incorporates the predetermined answer response with the particular data and transmits the combined information to the terminal corresponding to the user using the second transmission method. For example, the server incorporates the message "ACK" with the multimedia file and transmits the combined information using an instant message service to the terminal.

In S506, in response to transmitting the particular data using the second transmission method, the server determines whether the particular data transmitted using the second transmission method was received by the device based on whether a response including the predetermined answer response identifier has been received. In particular, the server determines whether an acknowledgement is received from the device within the waiting period in response to transmitting the information using the second transmission method. The server can detect that the device received the transmitted particular data when an acknowledgement is received from the terminal before the waiting period expires. Once the server determines that the user received the determined particular data, the server no longer sends the determined particular data to the terminal.

In S507, in response to determining that the particular data was received by the device when transmitted using at least one of the first transmission method or the second transmission method, the server transmits additional data to the device using a non-mobile communication method. In particular, once the server establishes that is the terminal has received the determined information from the previous transmissions using either the first transmission method or the second transmission method, the server can now transmit any future information to the terminal using any non-mobile communication methods. For instance, the non-mobile communication methods can include any transmission performed over the Internet and no longer requiring cellular methods.

The process described above is intended to detect whether a user receives and views, within a waiting time, information sent using a second sending method as an email, a direct message, or instant messaging. The server adds a predetermined answer response identifier to information waiting to be sent being sending the information using the second sending method, and then sends, to the user using the second sending method, the information that includes the added answer response identifier. Once the server transmits and receives an acknowledgement from the terminal using the first and/or second transmission method, the server no longer transmits using the mobile communications network and transmits using the internet, alone. Automatically, the server transitions to transmitting subsequent determined information only using the Internet saving bandwidth in mobile communication network resources.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example , files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is climed is:

1. A computer-implemented method performed by one or more processors comprising:

identifying, by the one or more processors, particular data for network transmission to a device;

determining, by the one or more processors, a waiting period for the particular data based on a content of the particular data;

transmitting, by the one or more processors, the particular data to the device using a first transmission method, wherein the first transmission method includes a mechanism to determine whether the particular data was received by the device;

in response to transmitting the particular data using the first transmission method, determining, by the one or more processors, whether the particular data transmitted using the first transmission method was received by the device;

regardless of whether or not the particular data transmitted using the first transmission method was received by the device, transmitting, by the one or more processors, the particular data and a predetermined answer response identifier to the device using a second transmission method, wherein the second transmission method does not include a mechanism to determine that the particular data was received by the device without receiving an acknowledgement response including the predetermined answer response identifier, wherein each of the first transmission method and the second transmission method is a non-mobile communication method;

in response to transmitting the particular data using the second transmission method, determining, by the one or more processors, whether the particular data transmitted using the second transmission method was received by the device based on whether the acknowledgement response including the predetermined answer response identifier has been received; and in response to determining that the particular data was received by the device within the waiting period when transmitted using at least one of the first transmission method or the second transmission method, transmitting, by the one or more processors, additional data to the device using the at least one of the first transmission method or the second transmission method, or determining, by the one or more processors, that the particular data transmitted using the first transmission method was not received by the device within the waiting period, determining, based on the acknowledgement response including the predetermined answer response identifier not being received, that the particular data transmitted using the second transmission method was not received by the device within the waiting period; and in response to determining that the particular data was not received by the device within the waiting period when transmitted using the first transmission method and the second transmission method, transmitting, by the one or more processors, the particular data to the device using an information sending method via a mobile communications network.

2. The computer-implemented method of claim 1, wherein the first transmission method is capable of detecting whether a user views the received particular data at the device.

3. The computer-implemented method of claim 1, wherein the first transmission method comprises an information sending method by using a Transmission Control Protocol TCP persistent connection and the second transmission method comprises an information sending method by means of at least one of an email, a direct message, and an instant message.

4. The computer-implemented method of claim 1, wherein transmitting, by the one or more processors, the particular data to the device using the first transmission method further comprises: transmitting, by the one or more processors, the particular data to the device using the first transmission method periodically over a specified time interval.

5. The computer-implemented method of claim 4, comprising transmitting the particular data to the device using the first transmission method periodically using the specified time interval until the waiting period expires.

6. The computer-implemented method of claim 1, wherein the content of the particular data comprises a size of the particular data and a type of the particular data.

7. A non-transitory, computer-readable medium storing one or more instructions executable by a computer system using one or more processors to perform operations comprising:
   identifying, by the one or more processors, particular data for network transmission to a device;
   determining, by the one or more processors, a waiting period for the particular data based on a content of the particular data;
   transmitting, by the one or more processors, the particular data to the device using a first transmission method, wherein the first transmission method includes a mechanism to determine whether the particular data was received by the device;
   in response to transmitting the particular data using the first transmission method, determining, by the one or more processors, whether the particular data transmitted using the first transmission method was received by the device;
   regardless of whether or not the particular data transmitted using the first transmission method was received by the device, transmitting, by the one or more processors, the particular data and a predetermined answer response identifier to the device using a second transmission method wherein the second transmission method does not include a mechanism to determine that the particular data was received by the device without receiving an acknowledgement response including the predetermined answer response identifier,
   wherein each of the first transmission method and the second transmission method is a non-mobile communication method;
   in response to transmitting the particular data using the second transmission method, determining, by the one or more processors, whether the particular data transmitted using the second transmission method was received by the device based on whether the acknowledgement response including the predetermined answer response identifier has been received; and
   in response to determining that the particular data was received by the device within the waiting period when transmitted using at least one of the first transmission method or the second transmission method, transmitting, by the one or more processors, additional data to the device using the at least one of the first transmission method or the second transmission method, or
   determining, by the one or more processors, that the particular data transmitted using the first transmission method was not received by the device within the waiting period,
   determining, based on the acknowledgement response including the predetermined answer response identifier not being received, that the particular data transmitted using the second transmission method was not received by the device within the waiting period; and
   in response to determining that the particular data was not received by the device within the waiting period when transmitted using the first transmission method and the second transmission method, transmitting, by the one or more processors, the particular data to the device using an information sending method via a mobile communications network.

8. The non-transitory computer-readable medium of claim 7, wherein the first transmission method is capable of detecting whether a user views the received particular data at the device.

9. The non-transitory computer-readable medium of claim 7, wherein the first transmission method comprises an information sending method by using a Transmission Control Protocol TCP persistent connection and the second transmission method comprises an information sending method by means of at least one of an email, a direct message, and an instant message.

10. The non-transitory computer-readable medium of claim 7, wherein transmitting, by the one or more processors, the particular data to the device using the first transmission method further comprises: transmitting, by the one or more processors, the particular data to the device using the first transmission method periodically over a specified time interval.

11. The non-transitory computer-readable medium of claim 10, comprising transmitting the particular data to the device using the first transmission method periodically using the specified time interval until the waiting period expires.

12. The non-transitory computer-readable medium of claim 7, wherein the content of the particular data comprises a size of the particular data and a type of the particular data.

13. A computer-implemented system, comprising:
   one or more computers; and
   one or more computer memory devices interoperably coupled with the one or more computers and having tangible, non-transitory, machine-readable media storing one or more instructions that, when executed by the one or more computers using one or more processors, perform one or more operations comprising:
      identifying, by the one or more processors, particular data for network transmission to a device;
      determining, by the one or more processors, a waiting period for the particular data based on a content of the particular data;
      transmitting, by the one or more processors, the particular data to the device using a first transmission method, wherein the first transmission method includes a mechanism to determine whether the particular data was received by the device;
      in response to transmitting the particular data using the first transmission method, determining, by the one or more processors, whether the particular data transmitted using the first transmission method was received by the device;

regardless of whether or not the particular data transmitted using the first transmission method was received by the device, transmitting, by the one or more processors, the particular data and a predetermined answer response identifier to the device using a second transmission method, wherein the second transmission method does not include a mechanism to determine that the particular data was received by the device without receiving an acknowledgement response including the predetermined answer response identifier, wherein each of the first transmission method and the second transmission method is a non-mobile communication method;

in response to transmitting the particular data using the second transmission method, determining, by the one or more processors, whether the particular data transmitted using the second transmission method was received by the device based on whether the acknowledgement response including the predetermined answer response identifier has been received; and in response to determining that the particular data was received by the device within the waiting period when transmitted using at least one of the first transmission method or the second transmission method, transmitting, by the one or more processors, additional data to the device using the at least one of the first transmission method or the second transmission method, or determining, by the one or more processors, that the particular data transmitted using the first transmission method was not received by the device within the waiting period, determining, based on the acknowledgement response including the predetermined answer response identifier not being received, that the particular data transmitted using the second transmission method was not received by the device within the waiting period; and in response to determining that the particular data was not received by the device within the waiting period when transmitted using the first transmission method and the second transmission method, transmitting, by the one or more processors, the particular data to the device using an information sending method via a mobile communications network.

14. The computer-implemented system of claim 13, wherein the first transmission method is capable of detecting whether a user views the received particular data at the device.

15. The computer-implemented system of claim 13, wherein the first transmission method comprises an information sending method by using a Transmission Control Protocol TCP persistent connection and the second transmission method comprises an information sending method by means of at least one of an email, a direct message, and an instant message.

16. The computer-implemented system of claim 13, wherein transmitting, by the one or more processors, the particular data to the device using the first transmission method further comprises: transmitting, by the one or more processors, the particular data to the device using the first transmission method periodically over a specified time interval.

17. The computer-implemented system of claim 13, wherein the content of the particular data comprises a size of the particular data and a type of the particular data.

\* \* \* \* \*